BEST AVAILABLE COPY png

NO DRA

No. 8774X PATENTED Apl 22 1835

Allen Belden

Improvement in Fur Substitute for dressed fur Skins

DESCRIPTION:

CLAIM:

In manufacturing a fur cloth or felting in such a manner of wool and fur combined or entirely of fur and of such size and shape as may be necessary in order to make a valuable and legant substitute for most of the different kinds of fur skins and peltry now in use.